(12) United States Patent
Kim et al.

(10) Patent No.: US 11,989,658 B2
(45) Date of Patent: May 21, 2024

(54) METHOD AND APPARATUS FOR REINFORCEMENT MACHINE LEARNING

(71) Applicant: ELECTRONICS AND TELECOMMUNICATIONS RESEARCH INSTITUTE, Daejeon (KR)

(72) Inventors: Hyunseok Kim, Daejeon (KR); Myung Eun Kim, Daejeon (KR); Seonghyun Kim, Daejeon (KR); Young Sung Son, Daejeon (KR); Jongkwon Son, Daejeon (KR); Soonyong Song, Daejeon (KR); Donghun Lee, Sejong-si (KR); Ingook Jang, Gwangmyeong-si (KR); Jin Chul Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 544 days.

(21) Appl. No.: 16/929,975

(22) Filed: Jul. 15, 2020

(65) Prior Publication Data

US 2021/0019644 A1  Jan. 21, 2021

(30) Foreign Application Priority Data

Jul. 16, 2019 (KR) .......................... 10-2019-0086015

(51) Int. Cl.
*G06N 3/092* (2023.01)
*G06N 20/00* (2019.01)
*G06N 7/00* (2023.01)

(52) U.S. Cl.
CPC ............. *G06N 3/092* (2023.01); *G06N 20/00* (2019.01); *G05B 2219/32334* (2013.01);
(Continued)

(58) Field of Classification Search
CPC .......... G06N 20/00; G06N 7/00; G06N 3/092; G05B 2219/34082; G05B 2219/40499; G05B 2219/32334; G05B 2219/33056
See application file for complete search history.

(56) References Cited

U.S. PATENT DOCUMENTS 9,939,791 B2   4/2018  Koga
10,417,562 B2  9/2019  Ioffe et al.
(Continued)

FOREIGN PATENT DOCUMENTS

KR  10-2017-0106227  9/2017
KR  10-2017-0108081  9/2017
(Continued)

OTHER PUBLICATIONS

Bellemare et al., "A Distributional Perspective on Reinforcement Learning" Jun. 21, 2017, arXiv: 1707.068887v1, pp. 1-19. (Year: 2017).*

(Continued)

*Primary Examiner* — Miranda M Huang
*Assistant Examiner* — Chase P. Hinckley
(74) *Attorney, Agent, or Firm* — KILE PARK REED & HOUTTEMAN PLLC

(57) ABSTRACT

A method and an apparatus for exclusive reinforcement learning are provided, comprising: collecting information of states of an environment through the communication interface and performing a statistical analysis on the states using the collected information; determining a first state value of a first state among the states in a training phase and a second state value of a second state among the states in an inference phase based on analysis results of the statistical analysis; performing reinforcement learning by using one reinforcement learning unit of a plurality of reinforcement learning unit which performs reinforcement learnings from different (Continued)

perspectives according to the first state value; and selecting one of actions determined by the plurality of reinforcement learning unit based on the second state value and applying selected action to the environment.

12 Claims, 5 Drawing Sheets

(52) U.S. Cl.
CPC .............. *G05B 2219/33056* (2013.01); *G05B 2219/34082* (2013.01); *G05B 2219/40499* (2013.01); *G06N 7/00* (2013.01)

(56) References Cited

U.S. PATENT DOCUMENTS

| | | | |
|---|---|---|---|
| 10,581,885 B1* | 3/2020 | Oh | G06N 3/08 |
| 10,628,710 B2 | 4/2020 | Ioffe et al. | |
| 10,860,920 B2* | 12/2020 | Gendron-Bellemare | G06N 3/08 |
| 10,902,319 B2 | 1/2021 | Ioffe et al. | |
| 11,243,532 B1* | 2/2022 | Levihn | G06N 3/045 |
| 11,281,973 B2 | 3/2022 | Ioffe et al. | |
| 11,308,394 B2 | 4/2022 | Ioffe et al. | |
| 11,366,433 B2* | 6/2022 | Iwane | G05B 13/0265 |
| 11,385,604 B2* | 7/2022 | Sasaki | G06N 20/00 |
| 11,449,750 B2* | 9/2022 | Simonyan | G06N 3/047 |
| 11,481,629 B2* | 10/2022 | Budden | G06N 3/0454 |
| 11,501,167 B2* | 11/2022 | Camilo Gamboa Higuera | G06N 3/08 |
| 11,537,872 B2* | 12/2022 | Pham | G06N 3/047 |
| 11,604,941 B1* | 3/2023 | Hester | G06V 10/82 |
| 11,604,997 B2* | 3/2023 | Gendron-Bellemare | G06N 3/044 |
| 11,734,575 B2* | 8/2023 | Agravante | G06N 3/088 706/21 |
| 2011/0150328 A1 | 6/2011 | Han et al. | |
| 2018/0165602 A1 | 6/2018 | Van Seijen et al. | |
| 2018/0165603 A1* | 6/2018 | Van Seijen | G06N 3/0454 |
| 2018/0189596 A1 | 7/2018 | Lee et al. | |
| 2019/0072916 A1* | 3/2019 | Fuji | G06N 3/126 |
| 2019/0130312 A1* | 5/2019 | Xiong | G06N 3/0481 |
| 2019/0228309 A1* | 7/2019 | Yu | G05B 13/048 |
| 2019/0332923 A1* | 10/2019 | Gendron-Bellemare | G06N 3/084 |
| 2019/0354867 A1* | 11/2019 | Czarnecki | G06N 3/006 |
| 2019/0370637 A1* | 12/2019 | Dunning | G06N 3/0445 |
| 2020/0034705 A1* | 1/2020 | Pham | G06N 3/08 |
| 2020/0110964 A1* | 4/2020 | Paik | G06N 7/005 |
| 2020/0143208 A1* | 5/2020 | Hernandez Leal | G06N 3/08 |
| 2020/0244707 A1* | 7/2020 | Silver | G06N 3/045 |
| 2020/0279136 A1* | 9/2020 | Subramanian | G06K 9/6227 |
| 2020/0285204 A1* | 9/2020 | Iwane | H02J 3/381 |
| 2020/0285208 A1* | 9/2020 | Okawa | G05B 19/0426 |
| 2020/0320435 A1* | 10/2020 | Sequeira | G06N 5/04 |
| 2020/0334565 A1* | 10/2020 | Tresp | G06N 20/00 |
| 2020/0364557 A1* | 11/2020 | Ostrovski | G06N 3/0454 |
| 2020/0380353 A1* | 12/2020 | Ding | G06N 3/08 |
| 2020/0380401 A1* | 12/2020 | Walton | H04L 67/52 |
| 2021/0064970 A1* | 3/2021 | Gendron-Bellemare | G06N 3/0454 |
| 2021/0110271 A1* | 4/2021 | Gendron-Bellemare | G06N 3/084 |
| 2021/0216870 A1 | 7/2021 | Ioffe et al. | |
| 2021/0224653 A1 | 7/2021 | Ioffe et al. | |
| 2021/0271968 A1* | 9/2021 | Ganin | G06F 30/20 |
| 2021/0319362 A1* | 10/2021 | Mguni | G06N 20/00 |
| 2022/0100154 A1* | 3/2022 | Takahashi | G06N 20/00 |
| 2022/0105624 A1* | 4/2022 | Kalakrishnan | B25J 9/163 |
| 2022/0172103 A1* | 6/2022 | Epperlein | G06N 20/00 |
| 2022/0261833 A1* | 8/2022 | Shang | G06N 3/08 |
| 2022/0405643 A1* | 12/2022 | Hernandez-Leal | G06N 3/094 |

FOREIGN PATENT DOCUMENTS

| | | | | |
|---|---|---|---|---|
| WO | WO-2018189404 A1 | * | 10/2018 | ............. G06F 17/18 |
| WO | WO-2018224695 A1 | * | 12/2018 | ............. G06N 3/006 |
| WO | WO-2020025633 A1 | * | 2/2020 | ......... G05B 19/4155 |

OTHER PUBLICATIONS

Camilo Gamboa Higuera et al., "Learning Domain Randomization Distributions for Transfer Learning" Apr. 26, 2019, U.S. Appl. No. 62/839,599. (Year: 2019).*
Kenton et al., "Generalizing from a few environments in safety-critical reinforcement learning" Jul. 2, 2019, arXiv: 1907.01475v1, pp. 1-16. (Year: 2019).*
Lowe et al., "Multi-Agent Actor-Critic for Mixed Cooperative-Competitive Environments" Jan. 16, 2018, arXiv:1706.02275v3, pp. 1-16. (Year: 2018).*
Mavrin et al., "Distributional Reinforcement Learning for Efficient Exploration" May 13, 2019, arXiv: 1905.06125v1, pp. 1-11. (Year: 2019).*
Patel, Yagna "Optimizing Market Making using Multi-agent Reinforcement Learning" Dec. 26, 2018, arXiv: 1812.10252v1, pp. 1-10. ( Year: 2018).*
O'Donoghue et al., "The Uncertainty Bellman Equation and Exploration" Oct. 22, 2018, arXiv: 1709.05380v4, pp. 1-13. (Year: 2018).*
Dabney et al., "Distributional Reinforcement Learning with Quantile Regression" Oct. 27, 2017, arXiv: 1710.10044v1, pp. 1-14. (Year: 2017).*
Colas et al., "A Hitchhiker's Guide to Statistical Comparisons of Reinforcement Learning Algorithms" Apr. 15, 2019, arXiv: 1904.06979v1, pp. 1-23. (Year: 2019).*
Saemendsson et al., "Meta Reinforcement Learning with Latent Variable Gaussian Processes" Jul. 7, 2018, arXiv: 1803.07551v2, pp. 1-11. (Year: 2018).*
Eysenbach et al., "Search on the Replay Buffer: Bridging Planning and Reinforcement Learning" Jun. 12, 2019, arXiv: 1906.05253v1, pp. 1-16. (Year: 2019).*
Koller et al., "Learning-based Model Predictive Control for Safe Exploration and Reinforcement Learning" Jun. 27, 2019, arXiv: 1906.12189v1, pp. 1-14. (Year: 2019).*
Agarwal et al., "Striving for Simplicity in Off-policy Deep Reinforcement Learning" Jun. 10, 2019, arXiv: 1907.04543v1, pp. 1-17. ( Year: 2019).*
Korenkevych et al., "Autoregressive Policies for Continuous Control Deep Reinforcement Learning" Mar. 27, 2019, arXiv: 1903.11524v1, pp. 1-13. (Year: 2019).*
Imagawa et al., "Optimistic Proximal Policy Optimization" Jun. 25, 2019, arXiv: 1906.11075v1, pp. 1-10. (Year: 2019).*
Bastani et al., "Verifiable Reinforcement Learning via Policy Extraction" Jan. 24, 2019, arXiv: 1805.08328v2, pp. 1-13. (Year: 2019).*
Esteban et al., "Hierarchical Reinforcement Learning for Concurrent Discovery of Compound and Composable Policies" May 23, 2019, arXiv: 1905.09668v1, pp. 1-8. (Year: 2019).*
Saemundsson et al., "Meta Reinforcement Learning with Latent Variable Gaussian Processes" Jul. 7, 2018, arXiv: 1803.07551v2, pp. 1-11. (Year: 2018).*
Tessler et al., "Distributional Policy Optimization: An Alternative Approach for Continuous Control" May 23, 2019, arXiv: 1905.09855v1, pp. 1-16. (Year: 2019).*
Nachum et al., "Smoothed Action Value Functions for Learning Gaussian Policies" Jul. 25, 2018, arXiv: 1803.02348v3, pp. 1-12. ( Year: 2018).*
Moerland et al., "The Potential of the Return Distribution for Exploration in RL" Jul. 2, 2018, arXiv: 1806.04242v2, pp. 1-11. (Year: 2018).*
Choi et al., "Distributional Deep Reinforcement Learning with a Mixture of Gaussians" May 2019, pp. 1-8. (Year: 2019).*
Parisotto et al., "Concurrent Meta Reinforcement Learning" Mar. 7, 2019, arXiv: 1903.02710v1, pp. 1-16. (Year: 2019).*

(56) References Cited

OTHER PUBLICATIONS

Rowland et al., "Statistics and Samples in Distributional Reinforcement Learning" Feb. 21, 2019, arXiv: 1902.08102v1, pp. 1-25. (Year: 2019).*
Wright et al., "Attentional Policies for Cross-Context Multi-Agent Reinforcement Learning" May 31, 2019, arXiv: 1905.13428v1, pp. 1-11. (Year: 2019).*
Xing, Libo, "Learning and Exploiting Multiple Subgoals for Fast Exploration in Hierarchical Reinforcement Learning" May 13, 2019, arXiv: 1905.05180v1, pp. 1-7. (Year: 2019).*
Chandak et al., "Learning Action Representations for Reinforcement Learning" May 14, 2019, arXiv: 1902.00183v2, pp. 1-18. (Year: 2019).*
Bellemare et al., "Distributional reinforcement learning with linear function approximation" Feb. 8, 2019, arXiv: 1902.03149v1, pp. 1-15. (Year: 2019).*

* cited by examiner

METHOD AND APPARATUS FOR REINFORCEMENT MACHINE LEARNING

CROSS-REFERENCE TO RELATED APPLICATION

This application claims priority to and the benefit of Korean Patent Application No. 10-2019-0086015 filed in the Korean Intellectual Property Office on Jul. 16, 2019, the entire contents of which are incorporated herein by reference.

BACKGROUND OF THE INVENTION

(a) Field of the Invention

This description relates to a method and apparatus for performing reinforcement learning mutually exclusively.

(b) Description of the Related Art

Reinforcement learning is a method in which an agent defined in a specific environment recognizes a current state of the environment, and selects an order of actions or actions among selectable actions to maximize rewards provided from the environment based on recognized state. Conventional reinforcement learning may be performed by learning policies that determine the actions by evaluating states and rewards from a single perspective. Therefore, when the range of state change is wide or the reward is not specific, the reinforcement learning may take a long time or may not be completed.

The above information disclosed in this Background section is only for enhancement of understanding of the background of the invention, and therefore it may contain information that does not form the prior art that is already known in this country to a person of ordinary skill in the art.

SUMMARY OF THE INVENTION

An exemplary embodiment provides an agent device for performing exclusive reinforcement learning.

Another embodiment of the present invention provides a method for performing exclusive reinforcement learning by an agent device.

Yet another embodiment of the present invention provides an agent apparatus for performing exclusive reinforcement learning.

An agent device for performing exclusive reinforcement learning according to an exemplary embodiment includes: a statistical analyzer configured to collect state information of sample states of an environment and performs a statistical analysis on the sample states using the collected state information; a state value determining processor configured to determine a first state value of a first state among the states in a training phase and a second state value of a second state among the states in an inference phase based on analysis results of the statistical analysis; a reinforcement learning processor configured to include a plurality of reinforcement learning unit which perform reinforcement learning from different perspectives according to the first state value; and an action selector configured to select one of actions determined by the plurality of reinforcement learning unit based on the second state value.

The analysis results of the statistical analysis may include an average and a standard deviation of the sample states, and the state value determining processor may be specifically configured to determine the first state value to 1 when an absolute value of the first state is greater than a sum of the average and the standard deviation and determine the first state value to 0 when the absolute value of the first state is less than or equal to the sum of the average and the standard deviation.

The plurality of reinforcement learning unit may include a central perspective reinforcement learning unit and a peripheral perspective reinforcement learning unit, and the reinforcement learning processor may be specifically configured to perform the reinforcement learning by using the peripheral perspective reinforcement learning unit when the first state value is 1 and perform the reinforcement learning by using the central perspective reinforcement learning unit when the first state value is 0.

The analysis result of the statistical analysis may include an average and a standard deviation of collected sample states, the state value determining processor may be specifically configured to determine the second state value to 1 when an absolute value of the second state is greater than a sum of the average and the standard deviation and determine the second state value to 0 when the absolute value of the second state is less than or equal to the sum of the average and the standard deviation, the plurality of reinforcement learning unit may include a central perspective reinforcement learning unit and a peripheral perspective reinforcement learning unit, and the action selector may be specifically configured to select an action determined by the peripheral perspective reinforcement learning unit when the second state value is 1 and select an action determined by the central perspective reinforcement learning unit when the second state value is 0.

The analysis result of the statistical analysis may include an average and a standard deviation of collected sample states, and the state value determining processor may be specifically configured to determine the first state value and the second state value based on locations of the first state and the second state in a normal distribution in accordance to the average and the standard deviation.

A method for performing exclusive reinforcement learning by an agent device according to another exemplary embodiment includes: collecting information of states of an environment and performing a statistical analysis on the states using the collected information; determining a first state value of a first state among the states in a training phase and a second state value of a second state among the states in an inference phase based on analysis results of the statistical analysis; performing reinforcement learning by using a plurality of reinforcement learning unit which performs reinforcement learnings from different perspectives according to the first state value; and selecting one of actions determined by the plurality of reinforcement learning unit based on the second state value and applying selected action to the environment.

The analysis results of the statistical analysis may include an average and a standard deviation of the states, and determining a first state value of a first state among the states in a training phase and a second state value of a second state among the states in an inference phase based on analysis results of the statistical analysis may include determining the first state value to 1 when an absolute value of the first state is greater than a sum of the average and the standard deviation and determining the first state value to 0 when the absolute value of the first state is less than or equal to the sum of the average and the standard deviation.

The plurality of reinforcement learning unit may include a central perspective reinforcement learning unit and a peripheral perspective reinforcement learning unit, and performing reinforcement learning by using a plurality of reinforcement learning unit which performs reinforcement learnings from different perspectives according to the first state value may include performing the reinforcement learning by using the peripheral perspective reinforcement learning unit when the first state value is 1 and performing the reinforcement learning by using the central perspective reinforcement learning unit when the first state value is 0.

The analysis result of the statistical analysis may include an average and a standard deviation of collected sample states, determining a first state value of a first state among the states in a training phase and a second state value of a second state among the states in an inference phase based on analysis results of the statistical analysis may include determining the second state value to 1 when an absolute value of the second state is greater than a sum of the average and the standard deviation and determining the second state value to 0 when the absolute value of the second state is less than or equal to the sum of the average and the standard deviation, the plurality of reinforcement learning unit may include a central perspective reinforcement learning unit and a peripheral perspective reinforcement learning unit, and selecting one of actions determined by the plurality of reinforcement learning unit based on the second state value and applying selected action to the environment may include selecting an action determined by the peripheral perspective reinforcement learning unit when the second state value is 1 and selecting an action determined by the central perspective reinforcement learning unit when the second state value is 0.

The analysis result of the statistical analysis may include an average and a standard deviation of collected sample states, and determining a first state value of a first state among the states in a training phase and a second state value of a second state among the states in an inference phase based on analysis results of the statistical analysis may include determining the first state value and the second state value based on locations of the first state and the second state in a normal distribution in accordance to the average and the standard deviation.

An agent apparatus for performing exclusive reinforcement learning according to yet another exemplary embodiment includes: processor, memory, and communication interface, wherein the processor executes the program stored in the memory to perform: collecting information of states of an environment through the communication interface and performing a statistical analysis on the states using the collected information; determining a first state value of a first state among the states in a training phase and a second state value of a second state among the states in an inference phase based on analysis results of the statistical analysis; performing reinforcement learning by using one reinforcement learning unit of a plurality of reinforcement learning unit which performs reinforcement learnings from different perspectives according to the first state value; and selecting one of actions determined by the plurality of reinforcement learning unit based on the second state value and applying selected action to the environment.

The analysis results of the statistical analysis may include an average and a standard deviation of the states, and when the processor performs the step of determining a first state value of a first state among the states in a training phase and a second state value of a second state among the states in an inference phase based on analysis results of the statistical analysis, the processor may perform determining the first state value to 1 when an absolute value of the first state is greater than a sum of the average and the standard deviation and determining the first state value to 0 when the absolute value of the first state is less than or equal to the sum of the average and the standard deviation.

The plurality of reinforcement learning unit may include a central perspective reinforcement learning unit and a peripheral perspective reinforcement learning unit, and when the processor performs the step of performing reinforcement learning by using a plurality of reinforcement learning unit which performs reinforcement learnings from different perspectives according to the first state value, the processor may perform performing the reinforcement learning by using the peripheral perspective reinforcement learning unit when the first state value is 1 and performing the reinforcement learning by using the central perspective reinforcement learning unit when the first state value is 0.

the analysis result of the statistical analysis may include an average and a standard deviation of collected sample states, when the processor performs the step of determining a first state value of a first state among the states in a training phase and a second state value of a second state among the states in an inference phase based on analysis results of the statistical analysis, the processor may perform determining the second state value to 1 when an absolute value of the second state is greater than a sum of the average and the standard deviation and determining the second state value to 0 when the absolute value of the second state is less than or equal to the sum of the average and the standard deviation, the plurality of reinforcement learning unit may include a central perspective reinforcement learning unit and a peripheral perspective reinforcement learning unit, and when the processor performs the step of selecting one of actions determined by the plurality of reinforcement learning unit based on the second state value and applying selected action to the environment, the processor may perform selecting an action determined by the peripheral perspective reinforcement learning unit when the second state value is 1 and selecting an action determined by the central perspective reinforcement learning unit when the second state value is 0.

The analysis result of the statistical analysis may include an average and a standard deviation of collected sample states, and when the processor performs the step of determining a first state value of a first state among the states in a training phase and a second state value of a second state among the states in an inference phase based on analysis results of the statistical analysis, the processor may perform determining the first state value and the second state value based on locations of the first state and the second state in a normal distribution in accordance to the average and the standard deviation.

DETAILED DESCRIPTION OF THE EMBODIMENTS

Figure 1:
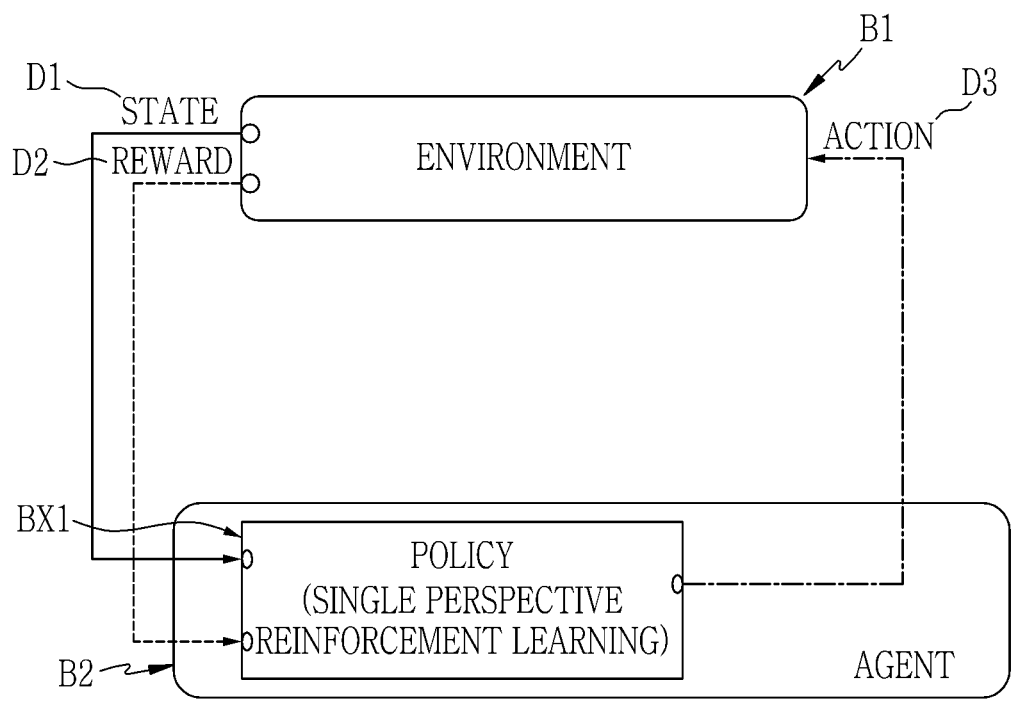
FIG. 1 is a schematic view illustrating a reinforcement learning method of an agent.

In the following detailed description, only certain exemplary embodiments have been shown and described, simply by way of illustration. As those skilled in the art would realize, the described embodiments may be modified in various different ways, all without departing from the spirit or scope of the embodiment.

Accordingly, the drawings and description are to be regarded as illustrative in nature and not restrictive, and like reference numerals designate like elements throughout the specification. In this specification, redundant description of the same constituent elements is omitted. Also, in this specification, it is to be understood that when one component is referred to as being "connected" or "coupled" to another component, it may be connected or coupled directly to the other component or may be connected or coupled to the other component with another component intervening therebetween.

On the other hand, in this specification, it is to be understood that when one component is referred to as being "connected or coupled directly" to another component, it may be connected or coupled to the other component without another component intervening therebetween.

It is also to be understood that the terminology used herein is only used for the purpose of describing particular embodiments, and is not intended to limit the embodiment. Singular forms are to include plural forms unless the context clearly indicates otherwise.

It will be further understood that terms "comprises" and "have" used in the present specification specify the presence of stated features, numerals, steps, operations, components, parts, or a combination thereof, but do not preclude the presence or addition of one or more other features, numerals, steps, operations, components, parts, or a combination thereof.

Also, as used herein, the term "and/or" includes any plurality of combinations of items or any of a plurality of listed items. In the present specification, "A or B" may include "A", "B", or "A and B"

FIG. 1 is a schematic view illustrating a reinforcement learning method of an agent.

Referring to FIG. 1, an agent B2 may recognize states (D1) of an environment (B1) and perform reinforcement learning on a policy (BX1) determining an action (D3) to be applied to the environment (single perspective reinforcement learning). Subsequently, the agent determines an action according to the policy based on the result of the reinforcement learning, where the action may be selected by the agent to maximize reward from the environment. The agent applies the selected action to the environment and receives the reward (D2) from the environment.

When the state change of the environment has a normal distribution characteristic, most of the learning data related to the state change (about 68.2%, within ±1 $\rho$ of the normal distribution) may be collected within the average ($\mu$) and standard deviation (±1$\rho$). Therefore, when reinforcement learning is performed using only this type of the learning data, because the reinforcement learning cannot be performed well for the various state changes of the actual environment (e.g., state changes outside the average and standard deviation), the action determined by the agent may be inaccurate.

Figure 2:
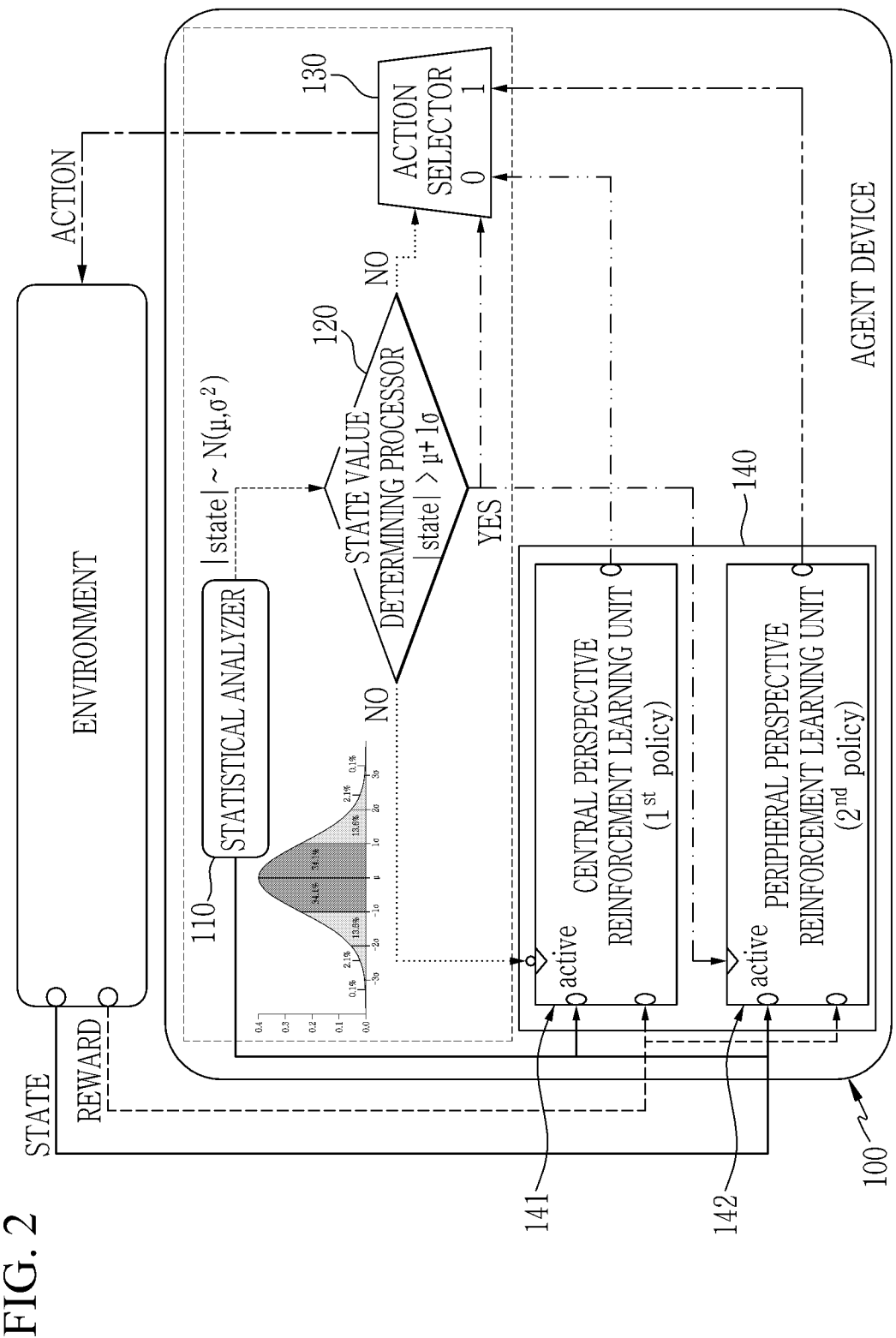
FIG. 2 is a schematic view illustrating an exclusive reinforcement learning method of an agent device according to an exemplary embodiment.
Figure 3:
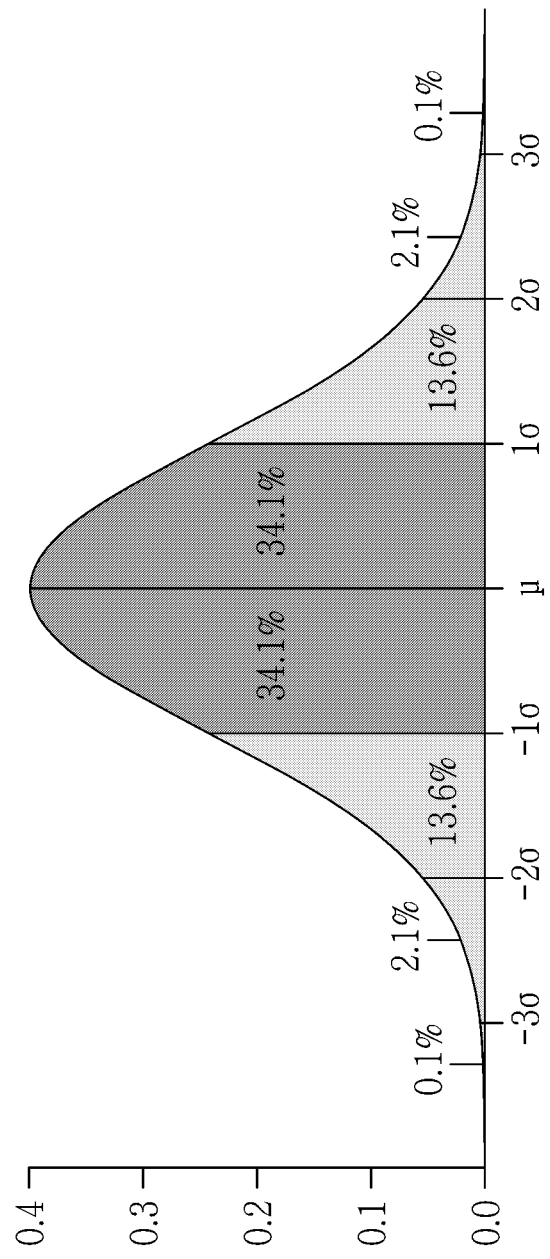
FIG. 3 is a normal distribution characteristic graph of a state according to an exemplary embodiment.

FIG. 2 is a schematic view illustrating an exclusive reinforcement learning method of an agent device according to an exemplary embodiment, and FIG. 3 is a normal distribution characteristic graph of a state according to an exemplary embodiment.

Referring to FIG. 2, an agent device 100 according to an exemplary embodiment includes a statistical analyzer 110, a state value determining processor 120, an action selector 130, and a reinforcement learning processor 140. The reinforcement learning processor 140 may include a central perspective reinforcement learning unit 141 and a peripheral perspective reinforcement learning unit 142.

The statistical analyzer 110 may statistically analyze the state input from the environment and calculate an average and a standard deviation of the state. The average and the standard deviation may be visualized as a normal distribution characteristic graph to determine the state value. When the state of the environment is quantified, the quantified state may have a characteristic of the normal distribution.

The statistical analyzer 110 of the agent device 100 according to the exemplary embodiment may perform a pre-processing for learning data for exclusive reinforcement learning from different perspectives, and statistically analyze the state of the environment as the learning data to calculate the average and the standard deviation of the state of the environment. The average and the standard deviation of the state may be visualized in the form of the normal distribution characteristic graph.

The reward which the environment provides to the agent device may include immediate reward for the performed action, accumulated reward for the plurality of actions, and the like. The reward in this description may be a reward of general reinforcement learning for the action applied by the agent to the environment, and the description is not limited thereto.

The state value determining processor 120 may determine locations of the states in the normal distribution characteristic graph in accordance to the average and the standard deviation and may transfer state values determined based on the locations to the action selector 130 to activate the reinforcement learning processor 140.

In FIG. 2, the state value determining processor 120 may compare the absolute value of the state with $\mu+1\rho$. Referring to FIG. 2, when the absolute value of the state is less than $\mu+1\rho$, the state value may be determined as 0, and when the absolute value of the state is greater than $\mu+1\rho$, the state value may be determined as 1.

In FIG. 2, the range of the standard deviation is 1$\rho$, but it may be determined as different values depending on the change of state and the type of the environment, and so on. When the state is located within ±1$\rho$ of the normal distribution characteristic graph, the central perspective reinforcement learning unit 141 may be activated, and when the state is located outside of ±1$\rho$ of the normal distribution characteristic graph, the peripheral perspective reinforcement learning unit 142 may be activated.

That is, in the training step, when the state of the environment for the reinforcement learning is input, the state value determining processor 120 may enable the reinforcement learning by the central perspective reinforcement learning unit 141 to be performed or the reinforcement learning by the peripheral perspective reinforcement learning unit 142 to be performed based on the location in the normal distribution characteristic graph of the state.

The action selector 130 may select an action determined by the reinforcement learning processor 140 according to the state value, to determine the action to be performed in the environment. Referring to FIG. 2, when the state value is 0, the action determined in the central perspective reinforcement learning unit 141 may be selected, and when the state value is 1, the action determined in the peripheral perspective reinforcement learning unit 142 may be selected.

That is, in the inference step, the action selector 130 may select an action determined by the central perspective reinforcement learning unit 141 or an action determined by the peripheral perspective reinforcement learning unit 142 according to the state value of the state of the environment to which the action is to be applied.

The agent device 100 according to the exemplary embodiment may be a control device for a cart-pole system. A 1-dimension cart pole system may include a cart moving left and right and a pole of which one end is fixed at the top of the cart.

In the cart pole system, the cart can move left and right according to the state of the pole (i.e., an angle between the pole and the vertical line) so that the pole does not fall (i.e., so that the pole remains vertical with respect to the floor surface where the cart moves).

In the cart pole system, a state input from an environment to the agent device 100 may be the angle between the pole and the vertical line. Therefore, the angle between the pole and the vertical line may be determined by the physical laws applied for the cart pole system, such as inertia of the cart and gravity acting on the pole. The reward may be determined according to whether the pole falls after the cart is controlled according to the state of the environment. For example, if the pole falls down, −1 point, and if it does not fall, 0 point may be provided as the reward.

In the cart pole system, the statistical analyzer 110 of the agent device 100 may calculate an average and a distribution (or standard deviation) of the angle between the pole and the vertical line, and a state value determining processor 120 may determine the value of the state of the pole based on statistical information such as the calculated average and distribution. For example, when $|state|>\mu+1\rho$, the state value may be determined as 1, and when $|state|<\mu+1\rho$, the state value may be determined as 0.

The state value=1 may indicate that the angle of the pole is largely changed, so that the peripheral perspective reinforcement learning unit 142 may be activated. When the peripheral perspective reinforcement learning unit 142 is activated, the action selector 130 may control the cart with a relatively large force to maintain the vertical state of the pole. The state value=0 may indicate that the angle of the pole is changed with a small width, so that the central perspective reinforcement learning unit 141 may be activated.

When the central perspective reinforcement learning unit 141 is activated, the action selector 130 may control the cart with a relatively small force to maintain the vertical state of the pole.

The cart pole system may be applied to various cases of actual environment. For example, in an autonomous vehicle, the agent device 100 may apply the cart pole system to perform lane keeping function for the vehicle. Here, the angle of the pole may be an angle between driving direction of the vehicle and the lane, and the control of the cart may correspond to a control of a steering device of the vehicle.

Alternatively, the agent device 100 may also be applied to equilibrium of the rocket propellant. Here, the angle of the pole may be an angle between the propulsion direction of the rocket and the direction of the gravity of the earth, and the control of the cart may correspond to a control of the output of the engine of the rocket.

Figure 4:
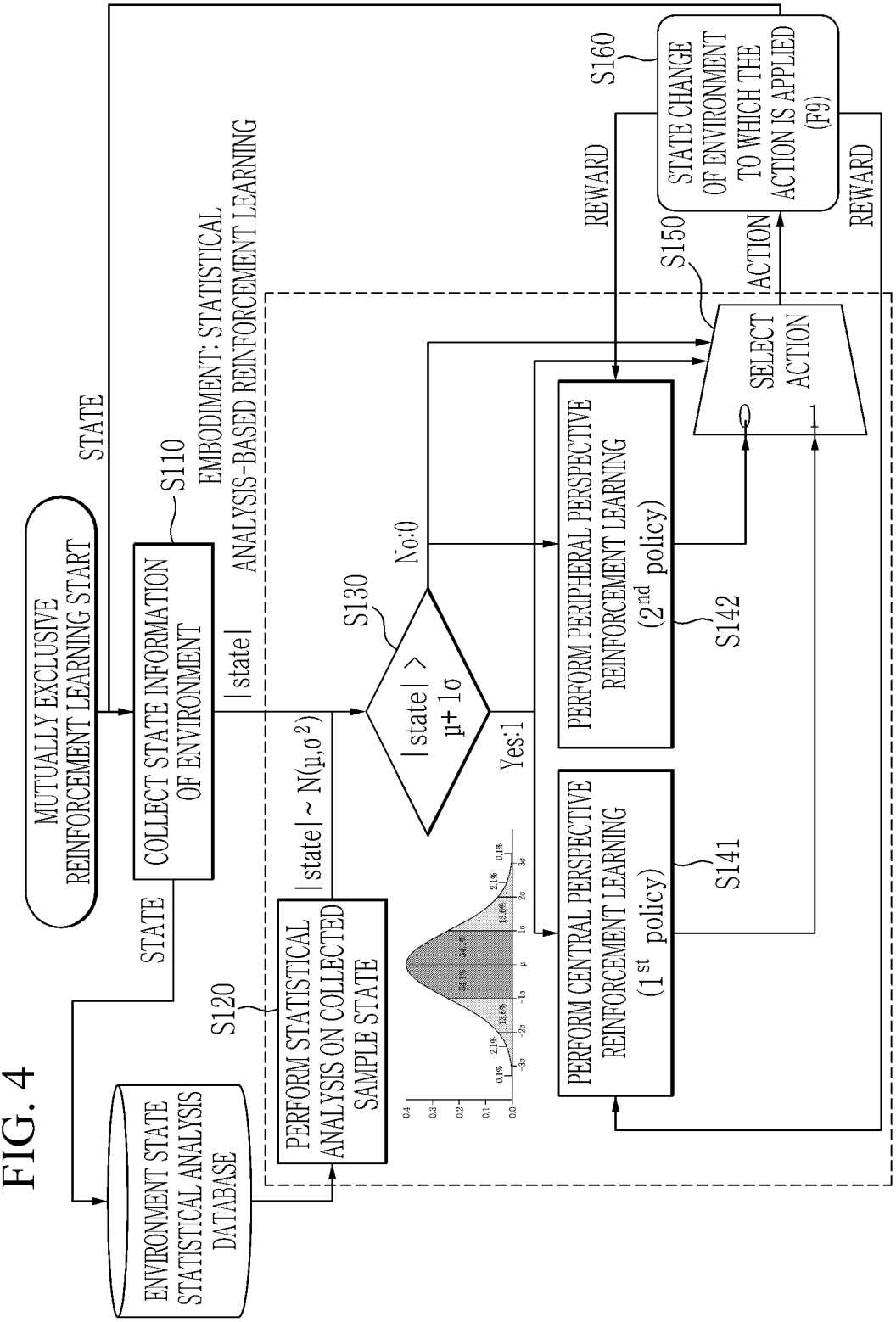
FIG. 4 is a flowchart illustrating an exclusive reinforcement learning method of an agent device according to an exemplary embodiment.

FIG. 4 is a flowchart illustrating an exclusive reinforcement learning method of an agent device according to an exemplary embodiment.

Referring to FIG. 4, the statistical analyzer 110 of the agent device 100 according to an exemplary embodiment may collect state information of sample states of the environment and may perform statistical analysis on the collected state information of the sample states (S110). The statistical analyzer 110 may determine a normal distribution characteristic graph corresponding to the environment to which the agent device 100 applies an action based on the analysis result of the statistical analysis. The analysis result of the statistical analysis may include an average and a standard deviation of the sample states.

Subsequently, in a reinforcement learning step (that is, training step), the state value determining processor 120 of the agent device 100 may use the normal distribution characteristic graph to determine a state value of the states of the environment (S130) and may perform a reinforcement learning by using the central perspective reinforcement learning unit 141 or the peripheral perspective reinforcement learning unit based on the state value of the state. For example, when the state value of the environment state is 0, a central perspective reinforcement learning by the central perspective reinforcement learning unit 141 may be performed (S141), and when the state value of the environment state is 1, a reinforcement learning by the peripheral perspective reinforcement learning unit 142 may performed (S142).

In an inference step, the action selector 130 of the agent device 100 may select an action according to the state value of the state of the environment to which the action is to be applied (S150). For example, the action selector 130 may select an action determined by the central perspective reinforcement learning unit 141 when the state value of the environment state is 0, and may select an action determined by the peripheral perspective reinforcement learning unit 142 when the state value of the environment state is 1. Thereafter, the agent device 100 may apply the selected action to the environment, a state change of the environment may occur, and the agent device 100 may receive a reward from the environment (S160). At this time, the reward may be input to the central perspective reinforcement learning unit 141 and the peripheral perspective reinforcement learning unit 142, respectively.

As described above, according to the exclusive reinforcement learning method according to the exemplary embodiments, the reinforcement learning may be performed by the central perspective and the peripheral perspective based on the statistical analysis of the state, thereby flexibly responding to various changes in the real environment and appropriate actions can be derived. This can be efficiently applied to an environment in which it is difficult to find rules due to lack of data or environment with high complexity. In addition, by reducing the number of the reinforcement learning cycles consisting of applying an action-receiving a reward, it is possible to reduce the consumption of computing resources of the agent device performing the reinforcement learning.

Figure 5:
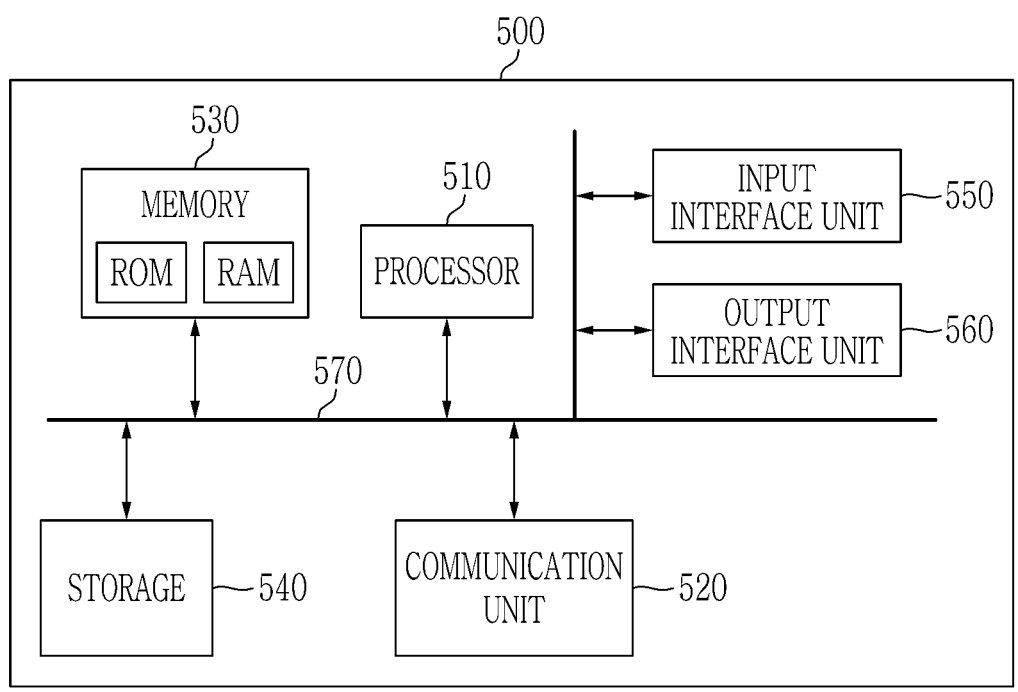
FIG. 5 is a block diagram illustrating an agent device performing exclusive reinforcement learning according to an exemplary embodiment.

FIG. 5 is a block diagram illustrating an agent device performing exclusive reinforcement learning according to an exemplary embodiment.

The agent device performing exclusive reinforcement learning may be implemented as a computer system, for example a computer readable medium. Referring to FIG. 5, a computer system 500 may include at least one of processor 510, a memory 530, an input interface unit 550, an output interface unit 560, and storage 540. The computer system 500 may also include a communication unit 520 coupled to a network. The processor 510 may be a central processing unit (CPU) or a semiconductor device that executes instructions stored in the memory 530 or storage 540.

The memory 530 and the storage 540 may include various forms of volatile or non-volatile storage media. For example, the memory may include read only memory (ROM) 531 or random access memory (RAM) 532. In the exemplary embodiment of the present disclosure, the memory may be located inside or outside the processor, and the memory may be coupled to the processor through various means already known. Thus, the embodiments may be embodied as a computer-implemented method or as a non-volatile computer-readable medium having computer-executable instructions stored thereon.

In the exemplary embodiment, when executed by a processor, the computer-readable instructions may perform the method according to at least one aspect of the present disclosure. The communication unit 520 may transmit or receive a wired signal or a wireless signal. On the contrary, the embodiments are not implemented only by the apparatuses and/or methods described so far, but may be implemented through a program realizing the function corresponding to the configuration of the embodiment of the present disclosure or a recording medium on which the program is recorded.

Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts.

The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like. Program instructions may include machine language code such as those produced by a compiler, as well as high-level language code that may be executed by a computer via an interpreter, or the like.

An apparatus for performing exclusive reinforcement learning according to an exemplary embodiment includes a processor 510 and a memory 530, and the processor 510 executes a program stored in the memory 530 to perform: collecting information of states of an environment through the communication interface and performing a statistical analysis on the states using the collected information; determining a first state value of a first state among the states in a training phase and a second state value of a second state among the states in an inference phase based on analysis results of the statistical analysis; performing reinforcement learning by using one reinforcement learning unit of a plurality of reinforcement learning unit which performs reinforcement learnings from different perspectives according to the first state value; and selecting one of actions determined by the plurality of reinforcement learning unit based on the second state value and applying selected action to the environment.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network. Processors suitable for execution of a computer program include, by way of example, both general and special purpose microprocessors, and any one or more processors of any kind of digital computer.

Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that this disclosure is not limited to the disclosed embodiments, but, on the contrary, is intended to cover various modifications and equivalent arrangements included within the spirit and scope of the appended claims.

What is claimed is:

1. An agent device for performing exclusive reinforcement learning, the device comprising:
    a processor;
    a statistical analyzer configured via the processor to collect state information of sample states of an environment and performs a statistical analysis on the sample states using the collected state information;
    a state value determining processor configured to determine a first state value of a first state among the states in a training phase and a second state value of a second state among the states in an inference phase based on analysis results of the statistical analysis;
    a reinforcement learning processor configured to include a plurality of reinforcement learning unit which perform reinforcement learning from different perspectives according to the first state value; and
    an action selector configured via the processor to select one of actions determined by the plurality of reinforcement learning unit based on the second state value,
    wherein the plurality of reinforcement learning unit includes a central perspective reinforcement learning unit and a peripheral perspective reinforcement learning unit,
    the reinforcement learning processor is specifically configured to perform the reinforcement learning by using the peripheral perspective reinforcement learning unit or the central perspective reinforcement learning unit according to the first state value, and
    the agent device applies the selected action to the environment and the agent device receives a reward from the environment, where the reward is input to the central perspective reinforcement learning unit and the peripheral perspective reinforcement learning unit, respectively, and
    wherein:
    the analysis result of the statistical analysis includes an average and a standard deviation of collected sample states,
    the state value determining processor is specifically configured to determine the second state value to 1 when an absolute value of the second state is greater than a sum of the average and the standard deviation and determine the second state value to 0 when the absolute value of the second state is less than or equal to the sum of the average and the standard deviation,
    the plurality of reinforcement learning unit includes a central perspective reinforcement learning unit and a peripheral perspective reinforcement learning unit, and
    the action selector via the processor is specifically configured to select an action determined by the peripheral perspective reinforcement learning unit when the second state value is 1 and select an action determined by the central perspective reinforcement learning unit when the second state value is 0.

2. The device of claim 1, wherein:
    the analysis results of the statistical analysis includes the average and the standard deviation of the sample states, and
    the state value determining processor is specifically configured to determine the first state value to 1 when an absolute value of the first state is greater than a sum of the average and the standard deviation and determine the first state value to 0 when the absolute value of the first state is less than or equal to the sum of the average and the standard deviation.

3. The device of claim 2, wherein
    the reinforcement learning processor is specifically configured to perform the reinforcement learning by using the peripheral perspective reinforcement learning unit when the first state value is 1 and perform the reinforcement learning by using the central perspective reinforcement learning unit when the first state value is 0.

4. The device of claim 1, wherein:
    the analysis result of the statistical analysis includes the average and the standard deviation of collected sample states, and
    the state value determining processor is specifically configured to determine the first state value and the second state value based on locations of the first state and the second state in a normal distribution in accordance to the average and the standard deviation.

5. A method for performing exclusive reinforcement learning by an agent device, the method comprising:
collecting information of states of an environment and performing a statistical analysis on the states using the collected information;
determining a first state value of a first state among the states in a training phase and a second state value of a second state among the states in an inference phase based on analysis results of the statistical analysis;
performing reinforcement learning by using a plurality of reinforcement learning unit which performs reinforcement learnings from different perspectives according to the first state value; and
selecting one of actions determined by the plurality of reinforcement learning unit based on the second state value and applying selected action to the environment,
wherein the plurality of reinforcement learning unit includes a central perspective reinforcement learning unit and a peripheral perspective reinforcement learning unit, and
wherein performing reinforcement learning by using a plurality of reinforcement learning unit which performs reinforcement learnings from different perspectives according to the first state value comprises
performing the reinforcement learning by using the peripheral perspective reinforcement learning unit or the central perspective reinforcement learning unit according to the first state value,
wherein the agent device applies the selected action to the environment and the agent device receives a reward from the environment, where the reward is input to the central perspective reinforcement learning unit and the peripheral perspective reinforcement learning unit, respectively, and
wherein:
the analysis result of the statist analysis includes an average and a standard deviation of collected sample states,
determining a first slate value of a state among tin states in a training phase and a second state value of a second state among the states in an inference phase based on analysis results of the statistical analysis comprises
determining the second state value to 1 when an absolute value of the second state is greater than a sum of the average and the standard deviation and determining the second state value to 0 when the absolute value of the second state is than or equal to the sum of the average and the standard deviation,
the plurality of reinforcement learning unit includes a central perspective reinforcement learning unit and a peripheral perspective reinforcement learning unit, and
selecting one of actions determined plurality of reinforcement earning, unit based on the second and applying selected action to the environment comprises
selecting an action determined by the peripheral perspective reinforcement learning unit is when the second state value is 1 and selecting an action determined by the central perspective reinforcement learning unit then the second stat value is 0.

6. The method of claim 5, wherein:
the analysis results of the statistical analysis includes the average and the standard deviation of the states, and
determining a first state value of a first state among the states in a training phase and a second state value of a second state among the states in an inference phase based on analysis results of the statistical analysis comprises
determining the first state value to 1 when an absolute value of the first state is greater than a sum of the average and the standard deviation and determining the first state value to 0 when the absolute value of the first state is less than or equal to the sum of the average and the standard deviation.

7. The method of claim 6, wherein:
performing reinforcement learning by using a plurality of reinforcement learning unit which performs reinforcement learnings from different perspectives according to the first state value comprises
performing the reinforcement learning by using the peripheral perspective reinforcement learning unit when the first state value is 1 and performing the reinforcement learning by using the central perspective reinforcement learning unit when the first state value is 0.

8. The method of claim 5, wherein:
the analysis result of the statistical analysis includes the average and the standard deviation of collected sample states, and
determining a first state value of a first state among the states in a training phase and a second state value of a second state among the states in an inference phase based on analysis results of the statistical analysis comprises
determining the first state value and the second state value based on locations of the first state and the second state in a normal distribution in accordance to the average and the standard deviation.

9. An agent apparatus for performing exclusive reinforcement learning, the apparatus comprising:
processor, memory, and communication interface,
wherein the processor executes the program stored in the memory to perform:
collecting information of states of an environment through the communication interface and performing a statistical analysis on the states using the collected information;
determining a first state value of a first state among the states in a training phase and a second state value of a second state among the states in an inference phase based on analysis results of the statistical analysis;
performing reinforcement learning by using one reinforcement learning unit of a plurality of reinforcement learning unit which performs reinforcement learnings from different perspectives according to the first state value; and
selecting one of actions determined by the plurality of reinforcement learning unit based on the second state value and applying selected action to the environment,
wherein the plurality of reinforcement learning unit includes a central perspective reinforcement learning unit and a peripheral perspective reinforcement learning unit, and
when the processor performs the step of performing reinforcement learning by using a plurality of reinforcement learning unit which performs reinforcement learnings from different perspectives according to the first state value, the processor performs
performing the reinforcement learning by using the peripheral perspective reinforcement learning unit or the central perspective reinforcement learning unit according to the first state value,
wherein the agent device applies the selected action to the environment and the agent device receives a reward from the environment, where the reward is input to the central perspective reinforcement learning unit and the peripheral perspective reinforcement learning unit, respectively, and wherein:

the analysis result of the statistical analysis includes an average and a standard deviation of collected sample states, when the processor performs the step of determining a first state value of a first state among the states in a training phase and a second state value of a second state among the states in an inference phase based on analysis results of the statistical analysis, the processor performs determining the second state value to 1 when an absolute value of the second state is greater than a sum of the average and the standard deviation and determining the second state value to 0 when the absolute value of the second state is less than r equal to the sum of the average and the standard deviation, the plurality of reinforcement learning unit includes a central perspective reinforcement learning unit and a peripheral perspective reinforcement learning unit, and when the processor performs the step of selecting one of actions determined by the plurality of reinforcement learning unit based on the second state value and applying selected action to the environment, the processor performs selecting an action determined by the peripheral perspective reinforcement learning unit when the second state value is 1 and selecting an action determined by the central perspective reinforcement learning unit when the second state value is 0.

10. The apparatus of claim 9, wherein:

the analysis results of the statistical analysis includes the average and the standard deviation of the states, and when the processor performs the step of determining a first state value of a first state among the states in a training phase and a second state value of a second state among the states in an inference phase based on analysis results of the statistical analysis, the processor performs determining the first state value to 1 when an absolute value of the first state is greater than a sum of the average and the standard deviation and determining the first state value to 0 when the absolute value of the first state is less than or equal to the sum of the average and the standard deviation.

11. The apparatus of claim 10, wherein:

when the processor performs the step of performing reinforcement learning by using a plurality of reinforcement learning unit which performs reinforcement learnings from different perspectives according to the first state value, the processor performs performing the reinforcement learning by using the peripheral perspective reinforcement learning unit when the first state value is 1 and performing the reinforcement learning by using the central perspective reinforcement learning unit when the first state value is 0.

12. The apparatus of claim 9, wherein:

the analysis result of the statistical analysis includes the average and the standard deviation of collected sample states, and when the processor performs the step of determining a first state value of a first state among the states in a training phase and a second state value of a second state among the states in an inference phase based on analysis results of the statistical analysis, the processor performs determining the first state value and the second state value based on locations of the first state and the second state in a normal distribution in accordance to the average and the standard deviation.

* * * * *